Jan. 4, 1955

R. T. DONOVAN 2,698,637

SCREW DRIVER BIT WITH PILOT SLEEVE

Filed June 12, 1952

INVENTOR.
Robert T. Donovan
BY William B. Jaspert
Attorney.

United States Patent Office 2,698,637
Patented Jan. 4, 1955

2,698,637

SCREW DRIVER BIT WITH PILOT SLEEVE

Robert T. Donovan, Pittsburgh, Pa., assignor to Ludwig Hommel & Co., Pittsburgh, Pa., a corporation of Pennsylvania Application June 12, 1952, Serial No. 293,128

2 Claims. (Cl. 145—51)

This invention relates to new and useful improvements in screw driver bits, and more particularly to a combination screw driver bit and pilot or finder sleeve used in power tools on assembly lines, and it is among the objects of this invention to provide a pilot sleeve for screw driver bits which shall be mounted on the shank of the bit in a manner to effect a material reduction in size, cost and time required to assemble and disassemble.

The invention will become more apparent from a consideration of the accompanying drawing, constituting a part hereof, in which like reference characters designate like parts, and in which.

Figures 1, 2, 3:
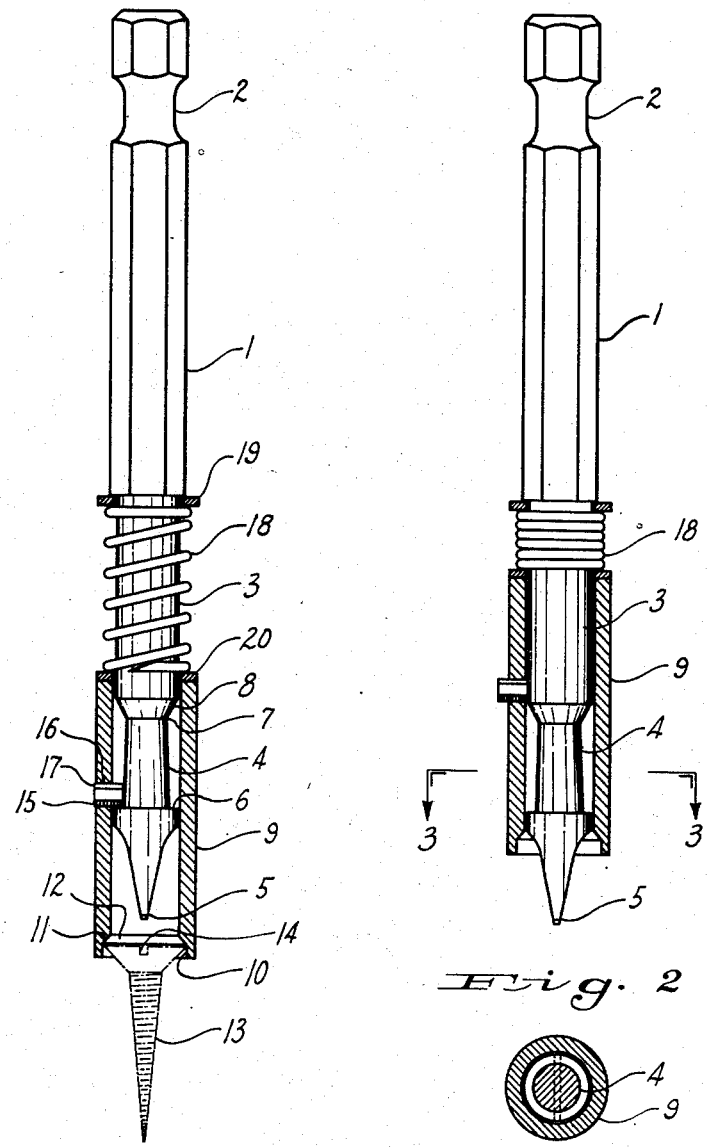
Fig. 1 is a side elevational view, partially in cross-section, of a screw driver bit and pilot sleeve embodying the principles of this invention.
Fig. 2 is a similar view of one position of the bit and sleeve.
Fig. 3 is a cross-sectional view taken along the line 3—3, Fig. 2.

In the drawing the numeral 1 designates a screw driver bit shank having a groove 2 for assembly in a power tool by a snap fit, as is conventional practice for such tools, the shank 1 being provided with a cylindrical portion 3, a recessed portion 4 and a screw driver point 5. The point terminates in a shoulder 6 and the recessed portion is slightly tapered from the shoulder 6 to a reduced diameter at 7 adjacent a sharp tapered shoulder 8 of the cylindrical portion 3. The enlarged head portion of the point 5 is of like diameter as the cylindrical portion 3 of the shank for the purpose of receiving a pilot sleeve 9 which is slidable thereon. The sleeve 9 is provided with a counter-bore 10 and a fillet portion 11 of a size to engage the head 12 of a screw 13 provided with the usual slot 14 or any other type of screw.

To retain the sleeve 9 on the screw driver shank, a cylindrical dowel sleeve 15 is provided which fits in a cylindrical bore 16 of the sleeve 9. The dowel 15 is split at 17 to constitute it a spring which prevents it from falling out of the cylindrical bore 16 while permitting easy sliding movement of the dowel sleeve in the bore 16. A coil spring 18 is provided between a pair of washers 19 and 20 to normally bias the sleeve 9 downward in the direction of the screw driver bit 5, and the dowel sleeve 15 abuts the shoulder 6 of the bit as shown in Fig. 1.

If it is desired to dismember the sleeve 9 from the screw driver bit, the sleeve is held and the bit is pressed downward in the manner shown in Fig. 2. When the dowel sleeve 15 engages the tapered shoulder portion 8, sleeve 15 will be displaced radially outward as shown in Fig. 2 and when the shank 1 is then retracted the sleeve 9 will slip over the end of the bit and is readily removed therefrom. When the sleeve is again assembled on the shank portion, the dowel sleeve 15 is merely pressed inward in the space between the sleeve and the recess 4 to the position shown in Fig. 1, when it will again abut the shoulder 6 of the screw driver bit.

In operation when the bit and pilot sleeve is assembled in the manner shown in Fig. 1, the pilot sleeve 9 is placed over the head of a screw and the point is pressed forward until it engages the screw which is then driven home. When the screw driver is operating on the screw the bit will be advanced the distance corresponding to the space between the screw head 12 and the end of the bit 5 as shown in Fig. 1, and when the bit is advanced such distance the dowel sleeve 15 will ride clear of the shoulder 6 in the space constituted by the recess 4 so that it is not subject to any wear due to rotating contact. It is for this reason that the recess 4 tapers inwardly toward the rear or shank portion of the bit, as is apparent from the several figures of the drawing.

It will be apparent from the above description of this invention that screw driver bits and pilot sleeves made in accordance therewith are of economical construction and provide for the ready removal of the pilot sleeve from the bit shank without the use of tools.

Although one embodiment of the invention has been herein illustrated and described, it will be apparent to those skilled in the art that various modifications may be made in the details of construction without departing from the principles herein set forth.

I claim:

1. A screw driver bit having a recess at one end for chucking and having a point at the other end, said bit having a tapered shank portion forming a circumferential recess adjacent said point, the large end of the taper terminating in a shoulder adjacent the point and the other end terminating in a chamfered shoulder, a cylindrical portion of the bit shank adjacent the chamfered shoulder, a sleeve slidingly mounted on the point and cylindrical shank portion, said sleeve having a recess at one end of the shape and size of a screw to be driven and having a friction dowel extending radially in the body portion thereof, which in the normal position of the sleeve in relation to the bit extends into the tapered recess of the bit shank, and a coil spring normally biasing said sleeve in the direction of the bit with the dowel sleeve resting against the square shoulder of the tapered recess.

2. A screw driver bit having a cylindrical body portion and having a point at one end for engaging a screw, a finder sleeve received on the body portion, a tapered shank portion intermediate the point and cylindrical body portion forming a circumferential recess terminating in a shoulder at the point end of the bit, said tapered shank gradually reducing in diameter towards the cylindrical body portion and then sharply tapering in the direction of the cylindrical body portion, a spring biasing the finder sleeve in the direction of the screw driver point and a frictional dowel extending radially through the sleeve into the recess of the screw driver bit, said dowel abutting the shoulder of the recess against the screw driver point in its normal position of operation and being adapted to be displaced when engaging the tapered shoulder of the recess to remove the finder sleeve from the bit.

References Cited in the file of this patent

UNITED STATES PATENTS

| Number | Name | Date |
|---|---|---|
| 198,935 | Gilchrist | Jan. 8, 1878 |

FOREIGN PATENTS

| Number | Country | Date |
|---|---|---|
| 575,178 | Great Britain | Feb. 6, 1946 |